(12) United States Patent
Tamaru et al.

(10) Patent No.: US 7,203,587 B2
(45) Date of Patent: Apr. 10, 2007

(54) SHIFT LEVER OPERATING POSITION JUDGING DEVICE

(75) Inventors: Daisuke Tamaru, Anjo (JP); Tomomitsu Terakawa, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 236 days.

(21) Appl. No.: 10/976,060

(22) Filed: Oct. 29, 2004

(65) Prior Publication Data

US 2005/0096821 A1 May 5, 2005

(30) Foreign Application Priority Data

Oct. 31, 2003 (JP) ............................. 2003-371435

(51) Int. Cl.
*G06F 7/00* (2006.01)
(52) U.S. Cl. ...................................................... 701/64
(58) Field of Classification Search .................. 701/51, 701/63, 64
See application file for complete search history.

(56) References Cited

U.S. PATENT DOCUMENTS

| | | | |
|---|---|---|---|
| 4,610,179 A * | 9/1986 | Parker | 74/335 |
| 5,561,416 A | 10/1996 | Marshall et al. | |
| 6,205,390 B1 * | 3/2001 | Holbrook et al. | 701/62 |
| 6,935,203 B2 * | 8/2005 | von Haeften et al. | 74/335 |

FOREIGN PATENT DOCUMENTS

| | | |
|---|---|---|
| DE | 41 35 362 A1 | 4/1993 |
| DE | 196 53 193 A1 | 7/1998 |
| EP | 0 978 670 A2 | 2/2000 |
| EP | 0 978 670 A3 | 2/2000 |
| JP | 5-90029 | 12/1993 |
| JP | 3419328 | 4/2003 |

* cited by examiner

*Primary Examiner*—Mark Hellner
(74) *Attorney, Agent, or Firm*—Buchanan Ingersoll & Rooney PC (57) ABSTRACT

A shift lever operating position judging device includes a position sensor having switches. Each switch is arranged to be at an ON state within a different range in a shift lever operating range, and two or three switches out of the plurality of switches are at the ON state in a different combination in response to each shift lever operating position. The device further includes a calculated value calculating means reading a sensor signal representing the ON or OFF state of the switches and calculating a calculated value based upon the signal, and a first operating position judging means for judging the shift lever position corresponding to the calculated value following a first operating position judgment reference defining the calculated value at the event that all of the plurality of switches have been at a normal condition.

13 Claims, 4 Drawing Sheets

Calculated value calculating means 31
First operating position judging means 32
Second operating position judging means 33
Releasing means 34
Judgment limiting means 35
Returning means 36
First operating position judgment reference 37
Second operating position judgment reference 38

SHIFT LEVER OPERATING POSITION JUDGING DEVICE

CROSS REFERENCE TO RELATED APPLICATIONS

This application is based on and claims priority under 35 U.S.C. §119 with respect to Japanese Patent Application 2003-371435, filed on Oct. 31, 2003, the entire content of which is incorporated herein by reference.

FIELD OF THE INVENTION

This invention generally relates to a shift lever operating position judging device adapted to judge an operating position of a shift lever. More particularly, this invention pertains to a shift lever operating position judging device capable of judging a shift lever position and malfunction of detection of a shift lever position in accordance with combinations of several switches.

BACKGROUND

A vehicle has been widely known, which has an automated manual transmission (hereinafter, referred to as AMT) that is structurally based upon a manual transmission (hereinafter, referred to as MT) and is adjusted to establish a shift stage in the MT at an appropriate shifting condition by a computer control, thereby enabling to improve fuel consumption. This type of vehicle further has a position sensor for detecting an operating position of the shift lever, and an electronic control unit for controlling a shift operation in response to a signal automatically outputted or manually outputted. The electronic control unit has a shift lever operating position-judging device for judging an operating position of a shift lever based upon a signal outputted from a position sensor.

The shift lever is selectively placed at plural positions such as a backward drive position "R", a neutral position "N", an automated shift position "D" and a manual shift position "M". The position sensor is constructed with plural switches turned ON upon the shifting operation of the shift lever to each position. The switch turned ON is employed as a parameter for judging the current position of the shift lever. When at least one of the switches of the shift lever position sensor malfunctions, the shift lever position may not be able to be recognized correctly. In light of foregoing, following devices have been well known, one of which is capable of detecting the shift lever position regardless of the shift lever position sensor failure, while the other one of which is capable of detecting the shift lever position sensor failure.

As a first example of the above, Japanese Patent No. 3419328 discloses a shift lever operating position detecting device, which is provided with four ON-OFF switches SW1, SW2, SW3 and SW4. Combined ON-OFF operations of the ON-OFF switches SW1, SW2, SW3 and SW4 exhibits to which operating position the shift lever had been shifted. There are five operating positions, namely, a reverse drive position "R", a neutral position "W", a forward-shift position "S", a shift-up position "+" and a shift-down position "−". Each ON-OFF switch outputs a switch signal of which signal level is opposite and a check signal. According to the disclosure, the actually malfunctioned ON-OFF switch can be identified. Further, the remaining three switches can identify the current shift position of the shift lever at least among the reverse drive position "R", the neutral position "N" and the forward-shift position "S".

As a second example of the above, Japanese Utility Model Application Publication No. 05(1993)-90029 discloses a shift lever position sensor failure judging device, which judges the failure of the shift lever position sensor in response to a signal outputted from the position sensor during the shifting operation.

In order to detect the failure of the ON-OFF switch provided in the shift lever operating position detecting device disclosed in the Japanese Patent No. 3419328, the device includes a first failure judging means for individually judging the failure of each ON-OFF switch based upon first and second signals outputted from each ON-OFF switch. The first failure judging means includes a first switch and a second switch. The first switch is placed in an ON state when the shift lever has shifted to a predetermined position and in an OFF state when the shift lever has shifted to any other position except for the predetermined position. The second switch is placed in an OFF state when the first switch is placed in the ON state, while is placed in an ON state when the first switch is placed in the OFF state. Namely, the first failure judging means is configured with two groups of switches, and so the number of switches may be increased.

In the shift lever position sensor failure judging device disclosed in the Japanese Utility Model Application Publication No. 05(1993)-90029, the failure is detected in response to the signal condition of each operating position of the shift lever. Therefore, the switch failure can not be detected at both ends of the operating position.

A need exists for providing a shift lever operating position judging device capable of judging a shift lever position by combinations of the less number of switches. A need further exists for providing a shift lever operating position judging device capable of judging a shift lever position and judging a failure by combinations of the less number of switches.

SUMMARY OF THE INVENTION

According to an aspect of the present invention, a shift lever operating position judging device includes a position sensor having a plurality of switches and outputting a signal associated with an ON or OFF state of the respective switches, the plurality of switches turned on and off in response to a position of a shift lever which is selectively operated within a shift lever operating range having at least four operating positions, wherein each switch is arranged to be at an ON state within a different range included in the shift lever operating range, and two or three switches out of the plurality of switches are at the ON state in a different combination in response to each shift lever operating position, a calculated value calculating means reading the signal representing the ON or OFF state of the respective switches and calculating a calculated value based upon the signal, the calculated value representing the ON or OFF state of the respective switches at each, shift lever operating position, and a first operating position judging means for judging the position of the shift lever corresponding to the calculated value obtained by the calculated value calculating means following a first operating position judgment reference defining the calculated value at the event that all of the plurality of switches have been at a normal condition.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
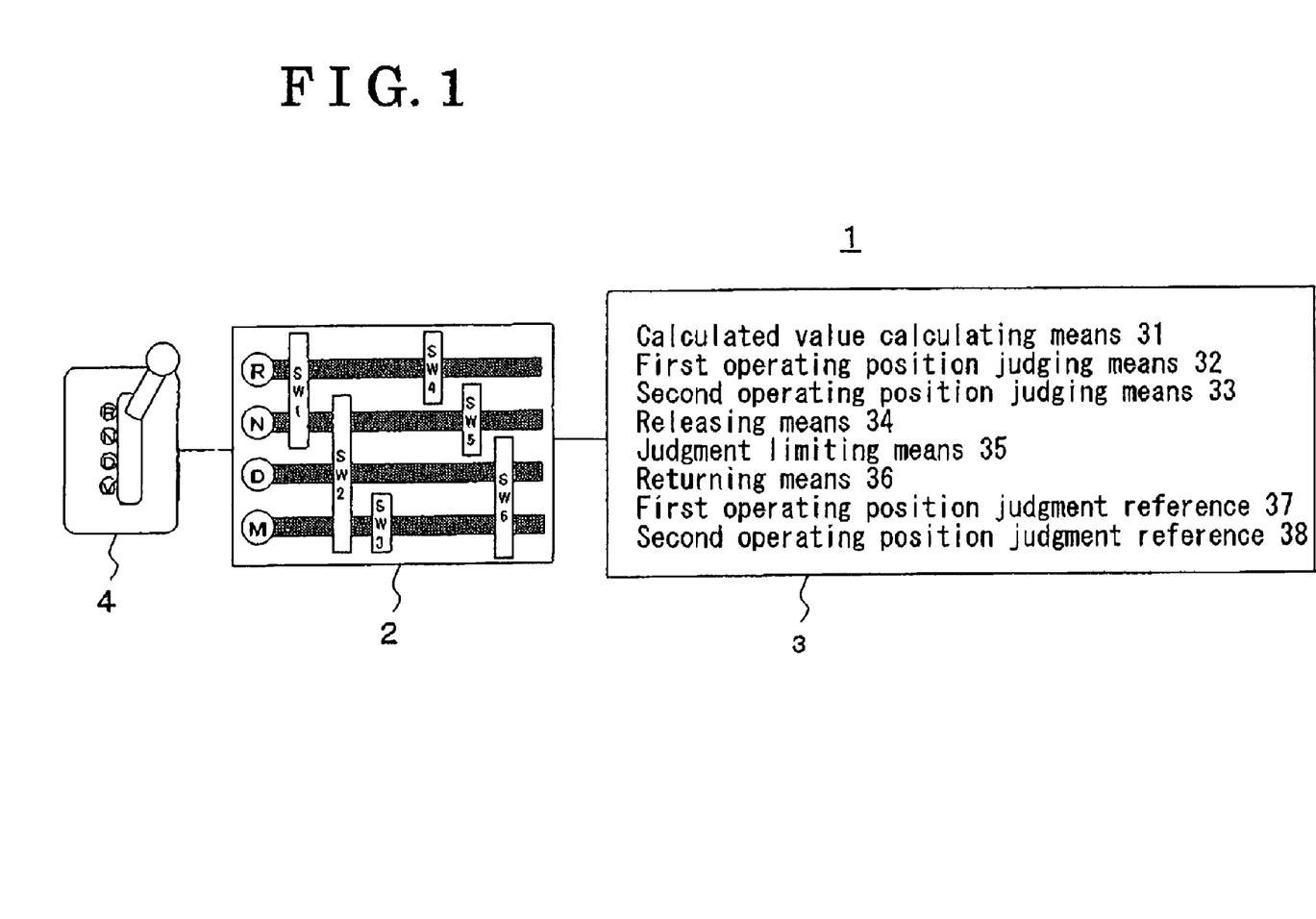
FIG. 1 is a block view schematically illustrating a structure of a shift lever operating position judging device according to an embodiment of the present invention.

As illustrated in FIG. 1, a shift lever operating position judging device 1 according to an embodiment of the present invention includes a shift lever position sensor 2 (i.e., position sensor) for outputting a signal representing a position of a shift lever 4 and a computer 3 inputted with the signal. The computer 3 then judges at which shift position the shift lever is placed.

Figure 2A:
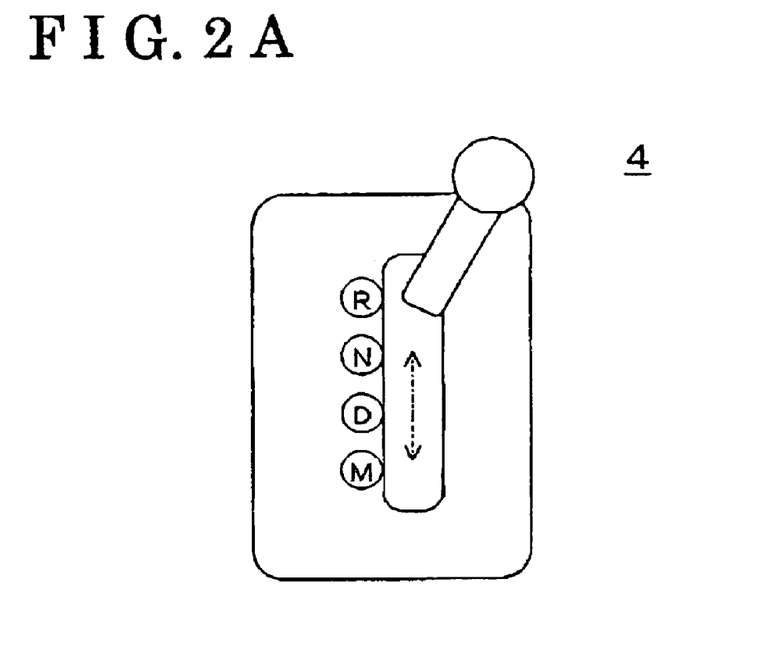
FIG. 2A is an outline view schematically illustrating a shift lever according to the embodiment of the present invention.
Figure 2B:
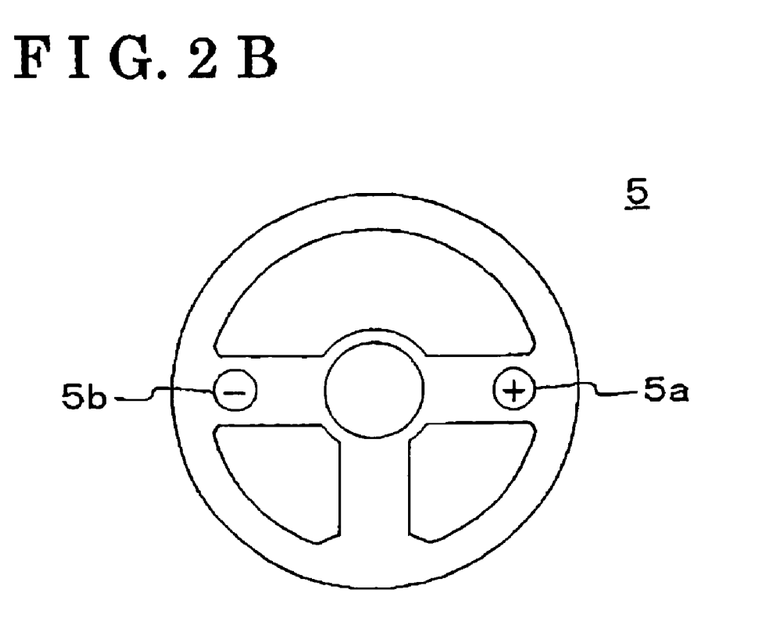
FIG. 2B is the other outline view schematically illustrating a structure of a steering wheel according to the embodiment of the present invention.

As illustrated in FIG. 2A, the shift lever 4 is mechanically and approximately linearly shifted among at least four positions: a reverse shift position "R" for establishing a reverse shift stage in a transmission, a neutral position "N" for establishing a neutral shift stage in the transmission, an automated forward shift position "D" for establishing one of plural forward shift stages in the transmission and a manual forward-shift position "M" for establishing one of the plural forward shift stages in the transmission. These four shift positions are allocated in the order of "R", "N", "D" and "M", as illustrated in FIG. 2A. When the shift lever 4 is placed at the manual forward-shift position "M", the forward shift stage in the transmission can be shifted up and down in response to an operation of a shift-up "(+)" switch 5a and a shift-down "(−)" switch 5b. Namely, the forward shift stage is shifted-up in the transmission in response to the manual operation of the shift-up switch 5a, while the forward shift stage is shifted-down in response to the manual operation of the shift-down switch 5b. The ON signals from the switches 5a and 5b are inputted to the computer 3.

Figure 3:
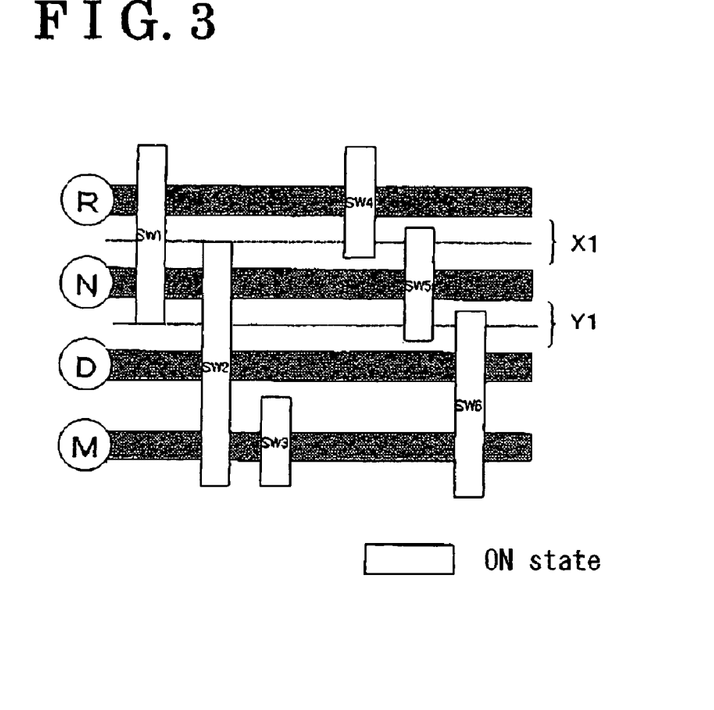
FIG. 3 is a diagram illustrating a first on-off switching pattern of each switch of a shift lever position sensor according to the embodiment of the present invention.
Figure 4:
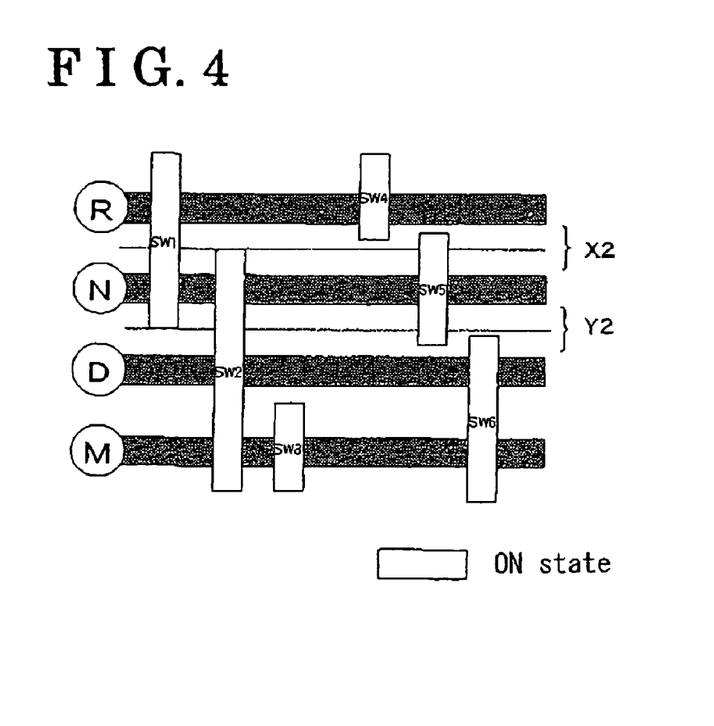
FIG. 4 is a diagram illustrating a second on-off switching pattern of each switch of the shift lever position sensor according to the embodiment of the present invention.

The position sensor 2 is equipped with several switches that are disposed to be respectively kept at an ON state at their own ranges within an entire operating area of the shift lever 4. Further, a different combination of two or three switches is turned on at each shift lever operating position R, N, D and M. For example, according to the embodiment of the present invention, the shift lever position sensor 2 is constructed with total six ON-OFF switches of a first switch SW1, a second switch SW2, a third switch SW3, a fourth switch SW4, a fifth switch SW5, a sixth switch SW6 and a brush (not shown). Each switch is a slide switch. The brush has been always electrically connected with a switch power source. FIGS. 3 and 4 explains an ON-OFF switching range of each switch of the shift lever position sensor 2. The switch SW1 is in the ON state when the shift lever 4 is positioned within a range from the reverse shift position "R" to a shifting range between the neutral position "N" and the automated forward shift position "D", while the switch SW1 is in an OFF state when the shift lever 4 is positioned beyond the aforementioned range. The switch SW2 is in the ON state when the shift lever 4 is positioned within a range from a shifting range (i.e. shift range) between the reverse shift position "R" and the neutral position "N" to the manual forward shift position "M", while the switch SW2 is in the OFF state when the shift lever 4 is positioned beyond the aforementioned range. The switch SW3 is in the ON state when the shift lever 4 is positioned within a range from a shifting range (i.e., shift range) between the automated forward-shift position "D" and the manual forward-shift position "M" to the manual forward shift position "M", while the switch SW3 is in the OFF state when the shift lever 4 is positioned beyond the aforementioned range. The switch SW4 is in the ON state when the shift lever 4 is positioned within a range from the reverse shift position "R" to a shifting range (i.e., shift range) between the reverse shift position "R" and the neutral position "N", while the switch SW4 is in the OFF state when the shift lever 4 is positioned beyond the aforementioned range. The switch SW5 is in the ON state when the shift lever 4 is positioned within a range from a shifting range (i.e., shift range) between the reverse shift position "R" and the neutral position "N" to a shifting range (i.e., shift range) between the neutral position "N" and the automated forward-shift position "D", while the switch SW5 is in the OFF state when the shift lever 4 is positioned beyond the aforementioned range. The switch SW6 is in the ON state from a shifting range (i.e., shift range) between the neutral position "N" to the automated forward-shift position "D" to the manual forward-shift position "M", while the switch SW6 is in the OFF state when the shift lever 4 is positioned beyond the aforementioned range. Each switch in the OFF state is not electrically excited.

Each ON-OFF switch may have individual specificity such as a production tolerance. Therefore, as illustrated in FIG. 3, there is a case that an ON-OFF switching point of the switch SW2 exists within a range, where the switches SW4 and SW5 are substantially simultaneously turned on, within the shifting range R–N (refer to X1 in FIG. 3). On the other hand, as illustrated in FIG. 4, there is a case that the ON-OFF switching point of the switch SW2 does not exist within the range (refer to X2 in FIG. 4). In the same manner as the shifting range R–N, there is a case that an ON-OFF switching point of the switch SW1 exists within a range, where the switches SW5 and SW6 are substantially simultaneously turned on, within the shifting range N–D (refer to Y1 in FIG. 3). On the other hand, as illustrated in FIG. 4, there is a case that the ON-OFF switching point of the switch SW1 does not exist within the range (refer to Y2 in FIG. 4). The ON signals from the respective switches SW1, SW2, SW3, SW4, SW5 and SW6 are inputted to the computer 3.

The computer 3 illustrated in FIG. 1 corresponds to an electronic control unit (ECU) which judges the operating position of the shift lever 4 based upon the signals outputted from the shift lever position sensor 2 and controls the shift operation in the transmission in response to the signals from the switches 5a and 5b automatically controlled or manually operated. The computer 3 includes an calculated value calculating means 31, a first operating position judging means 32, a second operating position judging means 33, a releasing means 34, a judgment limiting means 35 and a returning means 36. Processes implemented by the respective means are achieved by programs stored in the computer 3. Namely, the programs stored in a storage media (e.g., a hard disc, a read-only memory such as ROM) are read out via a read-only device and an interface and are loaded in a main memory of the computer 3. The programs loaded in the main memory can be employed in order to achieve the embodiment of the present invention.

The calculated value calculating means 31 reads a signal associated with the ON or OFF state of each switch SW1, SW2, SW3, SW4, SW5 and SW6 of the shift lever position sensor 2 and calculates a calculated value based upon the signal for each switch. The signal outputted from the switch at the ON state has been electrically excited, while the signal outputted from the switch at the OFF state has not been electrically excited. The method of calculating the calculated value is described later.

The first operating position judging means 32 judges the position of the shift lever 4, which corresponds to the calculated value computed by the calculated value calculating means 31, pursuant to a first operating position judgment reference 37. In addition to that, the first operating position judging means 32 can judge a condition of each switch between a normal condition or a failure condition, i.e., a single switch failure condition. In this case, the first operating position judging means 32 can be judged to have been at the normal or failure condition when the signal from each switch has been at the condition more than a predetermined period of time. The first operating position judgment reference 37 has at least two maps which respectively define the calculated values for each switch switched in response to each shift lever position (R, N, D and M) based upon the switching. That is, the first operating position judgment reference 37 defines the calculated value, which represents the ON or OFF state of each switch, in response to each shift lever position (R, N, D and M) at the event that all of the switches are at the normal conditions. Further, the first operating position judgment reference 37 defines the calculated value, which represents the ON or OFF state of each switch, in response to each shift lever position (R, N, D and M) at the event that any one of the switches is at the failure condition, i.e., at the event that a single switch failure has occurred. More details of the first operating position judgment reference 37 are described later. The normal condition indicates that the switch-can be normally switched between the ON and OFF states, while the failure condition indicates an ON-failure and an OFF-failure. At the ON-failure condition, the switch cannot be switched from the ON state to the OFF state due to a switch welding, a metal foreign particle and so on, thereby remaining at the ON state. At the OFF-failure condition, the switch can not be switched from the OFF state to the ON state due to an electric disconnection, a loose connection and so on, thereby remaining at the OFF state.

The second operating position judging means 33 implements following judgments based upon the first operating position judgment reference 37 and a second operating position judging reference 38. (1) Where the calculated value calculated by the calculated value calculating means 31 does not exist in the first operating position judgment reference 37, the second operating position judging means 33 computationally decides that the shift lever 4 has been placed at a safe position (neutral position N) and further can recognize a failure condition, i.e., a plural-switches failure condition. The second operating position judging means 33 can judge the plural-switches failure when the calculated value calculated by the calculated value calculating means 31 does not exist in the first operating position judgment reference 37 more than a predetermined period of time. (2) Where the calculated value existing in the first operating position judgment references 37 is obtained in the second operating position judgment reference 38, and an assumed shift position during the single switch failure condition corresponds to the assumed shift position during the plural-switches failure condition, the second operating position judging means 33 computationally determines that the assumed shift lever position is identical. (3) Where the calculated value existing in the first operating position judgment reference 37 is obtained in the second operating position judgment reference 38, and the assumed shift position during the single switch failure condition does not correspond to the assumed shift position during the plural-switches failure condition, the second operating position judging means 33 computationally determines that the shift lever has been placed at the safe position (neutral position N).

As described above, the second operating position judgment reference 38 has maps which respectively define the calculated value, which represents the ON or OFF state of each switch, in response to each shift lever position (R, N, D and M) at the event that at least two switches are at the failure conditions. More details are described later.

When any of the switches, which have malfunctioned, is switched ON or OFF within a predetermined period of time after having been judged to be at the second failure condition, the releasing means 34 releases the second operating position judging means 38 from being operated and activates the first operating position judging means 37.

When more than one switch is judged to have been at the failure condition, the judgment limiting means 35 does not allow the shift lever 4 to be judged to have been placed at a dangerous position (i.e., manual forward-shift position M). For example, when more than one switch has been at the failure condition, the shift lever 4, which is physically placed even at the manual forward-shift position M, is computationally decided to have been placed at the automated forward-shift position D.

When a condition, which is interpreted to be a non-failure condition, has been kept more than a predetermined period of time after judging that more than one switch has been at the failure condition, the returning means 36 returns the switch from the failure condition to the normal condition. For example, when the switch, which had malfunctioned, is normally operated more than the predetermined period of time after the malfunction thereof, a mode for judging the shift lever position by the second operating position judging means 33 is switched to a mode for judging the shift lever position by the first operating position judging means 32.

Next, following explanation will be given for explaining the method of calculating the calculated value by the calculated value calculating means 31 and the first operating position judgment reference 37 with reference to the attached drawings.

Table 1 according to the embodiment of the present invention summarizes a relationship between an ON-OFF condition of each switch during the normal condition and the calculated value corresponding to each shift lever position. Table 1 includes Tables 1A and 1B. Table 1A summarizes the relationship therebetween in accordance with the first ON-OFF switching pattern illustrated in FIG. 3, while Table 1B summarizes the relationship therebetween in accordance with the second ON-OFF switching pattern illustrated in FIG. 4.

TABLE 1A

| Normal | 1 | 2 | 3 | 4 | 5 | 6 | Calculated value |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 0 | 0 | 0 | 1 | 0 | 34 |
| N | 1 | 1 | 0 | 0 | 1 | 0 | 50 |
| \| | 0 | 1 | 0 | 0 | 1 | 0 | 18 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 1B

| Normal | 1 | 2 | 3 | 4 | 5 | 6 | Calculated |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 1 | 0 | 1 | 1 | 0 | 54 |
| N | 1 | 1 | 0 | 0 | 1 | 0 | 50 |
| \| | 1 | 1 | 0 | 0 | 1 | 1 | 51 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

Table 2 according to the embodiment of the present invention summarizes a relationship between the ON-OFF condition of each switch during one of the switches being at the OFF-failure condition and the calculated value corresponding to each shift lever position. Table 2 includes tables 2-A1, 2-A2, 2A3, 2-A4, 2-A5 and 2-A6 corresponding to the first ON-OFF switching pattern illustrated in FIG. 3, and tables 2-B1, 2-B2, 2-B3, 2-B4, 2-B5 and 2-B6 corresponding to the second ON-OFF switching pattern illustrated in FIG. 4. Tables 2-A1 and 2-B1 summarize the relationship in the event that the switch SW1 is at the OFF-failure condition, tables 2-A2 and 2-B2 summarize the relationship in the event that the switch SW2 is at the OFF-failure condition, tables 2-A3 and 2-B3 summarize the relationship in the event that the switch SW3 is at the OFF-failure condition, tables 2-A4 and 2-B4 summarize the relationship in the event that the switch SW4 is at the OFF-failure condition, tables 2-A5 and 2-B5 summarize the relationship in the event that the switch SW5 is at the OFF-failure condition, tables 2-A6 and 2-B6 summarize the relationship in the event that the switch SW6 is at the OFF-failure condition.

TABLE 2-A1

| SW1 OFF | 1 | 2 | 3 | 4 | 5 | 6 | Calculated value |
|---|---|---|---|---|---|---|---|
| R | 0 | 0 | 0 | 1 | 0 | 0 | 4 |
| \| | 0 | 0 | 0 | 1 | 1 | 0 | 6 |
| \| | 0 | 0 | 0 | 0 | 1 | 0 | 2 |
| N | 0 | 1 | 0 | 0 | 1 | 0 | 18 |
| \| | 0 | 1 | 0 | 0 | 1 | 0 | 18 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 2-B1

| SW1 | 1 | 2 | 3 | 4 | 5 | 6 | Calculated |
|---|---|---|---|---|---|---|---|
| R | 0 | 0 | 0 | 1 | 0 | 0 | 4 |
| \| | 0 | 0 | 0 | 1 | 1 | 0 | 6 |
| \| | 0 | 1 | 0 | 1 | 1 | 0 | 22 |
| N | 0 | 1 | 0 | 0 | 1 | 0 | 18 |
| \| | 0 | 1 | 0 | 0 | 1 | 1 | 19 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 2-A2

| SW2 OFF | 1 | 2 | 3 | 4 | 5 | 6 | Calculated value |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 0 | 0 | 0 | 1 | 0 | 34 |
| N | 1 | 0 | 0 | 0 | 1 | 0 | 34 |
| \| | 0 | 0 | 0 | 0 | 1 | 0 | 2 |
| \| | 0 | 0 | 0 | 0 | 1 | 1 | 3 |
| D | 0 | 0 | 0 | 0 | 0 | 1 | 1 |
| M | 0 | 0 | 1 | 0 | 0 | 1 | 9 |

TABLE 2-B2

| SW2 OFF | 1 | 2 | 3 | 4 | 5 | 6 | Calculated value |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 0 | 0 | 1 | 1 | 0 | 38 |
| N | 1 | 0 | 0 | 0 | 1 | 0 | 34 |
| \| | 1 | 0 | 0 | 0 | 1 | 1 | 35 |
| \| | 0 | 0 | 0 | 0 | 1 | 1 | 3 |
| D | 0 | 0 | 0 | 0 | 0 | 1 | 1 |
| M | 0 | 0 | 1 | 0 | 0 | 1 | 9 |

TABLE 2-A3

| SW3 OFF | 1 | 2 | 3 | 4 | 5 | 6 | Calculated value |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 0 | 0 | 0 | 1 | 0 | 34 |
| N | 1 | 1 | 0 | 0 | 1 | 0 | 50 |
| \| | 0 | 1 | 0 | 0 | 1 | 0 | 18 |
| \| | 0 | 1 | 0 | 0 | 1 | 1 | 19 |
| D | 0 | 1 | 0 | 0 | 0 | 1 | 17 |
| M | 0 | 1 | 0 | 0 | 0 | 1 | 17 |

TABLE 2-B3

| SW3 | 1 | 2 | 3 | 4 | 5 | 6 | Calculated |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 1 | 0 | 1 | 1 | 0 | 54 |
| N | 1 | 1 | 0 | 0 | 1 | 0 | 50 |
| \| | 1 | 1 | 0 | 0 | 1 | 1 | 51 |
| \| | 0 | 1 | 0 | 0 | 1 | 1 | 19 |

TABLE 2-B3-continued

| SW3 | SW 1 | 2 | 3 | 4 | 5 | 6 | Calculated |
|---|---|---|---|---|---|---|---|
| D | 0 | 1 | 0 | 0 | 0 | 1 | 17 |
| M | 0 | 1 | 1 | 0 | 0 | 1 | 17 |

TABLE 2-A4

| SW4 OFF | SW 1 | 2 | 3 | 4 | 5 | 6 | Calculated value |
|---|---|---|---|---|---|---|---|
| R | 1 | 0 | 0 | 0 | 0 | 0 | 32 |
|   | 1 | 0 | 0 | 0 | 1 | 0 | 34 |
|   | 1 | 0 | 0 | 0 | 1 | 0 | 34 |
| N | 1 | 1 | 0 | 0 | 1 | 0 | 50 |
|   | 0 | 1 | 0 | 0 | 1 | 0 | 18 |
|   | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 2-B4

| SW4 | SW 1 | 2 | 3 | 4 | 5 | 6 | Calculated |
|---|---|---|---|---|---|---|---|
| R | 1 | 0 | 0 | 0 | 0 | 0 | 32 |
|   | 1 | 0 | 0 | 0 | 1 | 0 | 34 |
|   | 1 | 1 | 0 | 0 | 1 | 0 | 50 |
| N | 1 | 1 | 0 | 0 | 1 | 0 | 50 |
|   | 1 | 1 | 0 | 0 | 1 | 1 | 51 |
|   | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 2-A5

| SW5 OFF | SW 1 | 2 | 3 | 4 | 5 | 6 | Calculated value |
|---|---|---|---|---|---|---|---|
| R | 1 | 0 | 0 | 1 | 0 | 0 | 36 |
|   | 1 | 0 | 0 | 1 | 0 | 0 | 36 |
|   | 1 | 0 | 0 | 0 | 0 | 0 | 32 |
| N | 1 | 1 | 0 | 0 | 0 | 0 | 48 |
|   | 0 | 1 | 0 | 0 | 0 | 0 | 16 |
|   | 0 | 1 | 0 | 0 | 0 | 1 | 17 |
| D | 0 | 1 | 0 | 0 | 0 | 1 | 17 |
| M | 0 | 1 | 1 | 0 | 0 | 1 | 25 |

TABLE 2-B5

| SW5 OFF | SW 1 | 2 | 3 | 4 | 5 | 6 | Calculated value |
|---|---|---|---|---|---|---|---|
| R | 1 | 0 | 0 | 1 | 0 | 0 | 36 |
|   | 1 | 0 | 0 | 1 | 0 | 0 | 36 |
|   | 1 | 1 | 0 | 1 | 0 | 0 | 52 |
| N | 1 | 1 | 0 | 0 | 0 | 0 | 48 |
|   | 1 | 1 | 0 | 0 | 0 | 1 | 49 |
|   | 0 | 1 | 0 | 0 | 0 | 1 | 17 |
| D | 0 | 1 | 0 | 0 | 0 | 1 | 17 |
| M | 0 | 1 | 1 | 0 | 0 | 1 | 25 |

TABLE 2-A6

| SW6 OFF | SW 1 | 2 | 3 | 4 | 5 | 6 | Calculated value |
|---|---|---|---|---|---|---|---|
| R | 1 | 0 | 0 | 1 | 0 | 0 | 36 |
|   | 1 | 0 | 0 | 1 | 1 | 0 | 38 |
|   | 1 | 0 | 0 | 0 | 1 | 0 | 34 |
| N | 1 | 1 | 0 | 0 | 1 | 0 | 50 |
|   | 0 | 1 | 0 | 0 | 1 | 0 | 18 |
|   | 0 | 1 | 0 | 0 | 1 | 0 | 18 |
| D | 0 | 1 | 0 | 0 | 0 | 0 | 16 |
| M | 0 | 1 | 1 | 0 | 0 | 0 | 24 |

TABLE 2-B6

| SW6 | SW 1 | 2 | 3 | 4 | 5 | 6 | Calculated |
|---|---|---|---|---|---|---|---|
| R | 1 | 0 | 0 | 1 | 0 | 0 | 36 |
|   | 1 | 0 | 0 | 1 | 1 | 0 | 38 |
|   | 1 | 0 | 0 | 1 | 1 | 0 | 54 |
| N | 1 | 1 | 0 | 0 | 1 | 0 | 50 |
|   | 1 | 1 | 0 | 0 | 1 | 0 | 50 |
|   | 0 | 1 | 0 | 0 | 1 | 0 | 18 |
| D | 0 | 1 | 0 | 0 | 0 | 0 | 16 |
| M | 0 | 1 | 1 | 0 | 0 | 0 | 24 |

Table 3 according to the embodiment of the present invention summarizes a relationship between the ON-OFF condition of each switch during one of the switches being at the ON-failure condition and the calculated value corresponding to each shift lever position. Table 3 includes tables 3-A1, 3-A2, 3-A3, 3-A4, 3-A5 and 3-A6 corresponding to the first ON-OFF switching pattern illustrated in FIG. 3, and tables 3-B1, 3-B2, 3-B3, 3-B4, 3-B5 and 3-B6 corresponding to the second ON-OFF switching pattern illustrated in FIG. 4. Tables 3-A1 and 3-B1 summarize the relationship in the event that the switch SW1 is at the ON-failure condition, tables 3-A2 and 3-B2 summarize the relationship in the event that the switch SW2 is at the ON-failure condition, tables 3-A3 and 3-B3 summarize the relationship in the event that the switch SW3 is at the ON-failure condition, tables 3-A4 and 3-B4 summarize the relationship in the event that the switch SW4 is at the ON-failure condition, tables 3-A5 and 3-B5 summarize the relationship in the event that the switch SW5 is at the ON-failure condition, tables 3-A6 and 3-B6 summarize the relationship in the event that the switch SW6 is at the ON-failure condition.

TABLE 3-A1

| SW1 ON | SW 1 | 2 | 3 | 4 | 5 | 6 | Calculated value |
|---|---|---|---|---|---|---|---|
| R | 1 | 0 | 0 | 1 | 0 | 0 | 36 |
|   | 1 | 0 | 0 | 1 | 1 | 0 | 38 |
|   | 1 | 0 | 0 | 0 | 1 | 0 | 34 |
| N | 1 | 1 | 0 | 0 | 1 | 0 | 50 |
|   | 1 | 1 | 0 | 0 | 1 | 0 | 50 |
|   | 1 | 1 | 0 | 0 | 1 | 1 | 51 |
| D | 1 | 1 | 0 | 0 | 0 | 1 | 49 |
| M | 1 | 1 | 1 | 0 | 0 | 1 | 57 |

TABLE 3-B1

| SW1 | SW 1 | 2 | 3 | 4 | 5 | 6 | Calculated |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 1 | 0 | 1 | 1 | 0 | 54 |
| N | 1 | 1 | 0 | 0 | 1 | 0 | 50 |
| \| | 1 | 1 | 0 | 0 | 1 | 1 | 51 |
| \| | 1 | 1 | 0 | 0 | 1 | 1 | 51 |
| D | 1 | 1 | 0 | 0 | 0 | 1 | 49 |
| M | 1 | 1 | 1 | 0 | 0 | 1 | 57 |

TABLE 3-A2

| SW1 ON | SW 1 | 2 | 3 | 4 | 5 | 6 | Calculated value |
|---|---|---|---|---|---|---|---|
| R | 1 | 1 | 0 | 1 | 0 | 0 | 52 |
| \| | 1 | 1 | 0 | 1 | 1 | 0 | 54 |
| \| | 1 | 1 | 0 | 0 | 1 | 0 | 50 |
| N | 1 | 1 | 0 | 0 | 1 | 0 | 50 |
| \| | 0 | 1 | 0 | 0 | 1 | 0 | 18 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 3-B2

| SW2 | SW 1 | 2 | 3 | 4 | 5 | 6 | Calculated |
|---|---|---|---|---|---|---|---|
| R | 1 | 1 | 0 | 1 | 0 | 0 | 52 |
| \| | 1 | 1 | 0 | 1 | 1 | 0 | 54 |
| \| | 1 | 1 | 0 | 1 | 1 | 0 | 54 |
| N | 1 | 1 | 0 | 0 | 1 | 0 | 50 |
| \| | 1 | 1 | 0 | 0 | 1 | 1 | 51 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 3-A3

| SW2 ON | SW 1 | 2 | 3 | 4 | 5 | 6 | Calculated value |
|---|---|---|---|---|---|---|---|
| R | 1 | 0 | 1 | 1 | 0 | 0 | 44 |
| \| | 1 | 0 | 1 | 1 | 1 | 0 | 46 |
| \| | 1 | 0 | 1 | 0 | 1 | 0 | 42 |
| N | 1 | 1 | 1 | 0 | 1 | 0 | 58 |
| \| | 0 | 1 | 1 | 0 | 1 | 0 | 26 |
| \| | 0 | 1 | 1 | 0 | 1 | 1 | 27 |
| D | 0 | 1 | 1 | 0 | 0 | 1 | 25 |
| M | 0 | 1 | 1 | 0 | 0 | 1 | 25 |

TABLE 3-B3

| Normal | SW 1 | 2 | 3 | 4 | 5 | 6 | Calculated value |
|---|---|---|---|---|---|---|---|
| R | 1 | 0 | 1 | 1 | 0 | 0 | 44 |
| \| | 1 | 0 | 1 | 1 | 1 | 0 | 46 |
| \| | 1 | 1 | 1 | 1 | 1 | 0 | 62 |
| N | 1 | 1 | 1 | 0 | 1 | 0 | 58 |
| \| | 1 | 1 | 1 | 0 | 1 | 1 | 59 |
| \| | 0 | 1 | 1 | 0 | 1 | 1 | 27 |

TABLE 3-B3-continued

| Normal | SW 1 | 2 | 3 | 4 | 5 | 6 | Calculated value |
|---|---|---|---|---|---|---|---|
| D | 0 | 1 | 1 | 0 | 0 | 1 | 25 |
| M | 0 | 1 | 1 | 0 | 0 | 1 | 25 |

TABLE 3-A4

| Normal | SW 1 | 2 | 3 | 4 | 5 | 6 | Calculated value |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 0 | 0 | 1 | 1 | 0 | 38 |
| N | 1 | 1 | 0 | 1 | 1 | 0 | 54 |
| \| | 0 | 1 | 0 | 1 | 1 | 0 | 22 |
| \| | 0 | 1 | 0 | 1 | 1 | 1 | 23 |
| D | 0 | 1 | 0 | 1 | 0 | 1 | 21 |
| M | 0 | 1 | 1 | 1 | 0 | 1 | 29 |

TABLE 3-B4

| Normal | SW 1 | 2 | 3 | 4 | 5 | 6 | Calculated |
|---|---|---|---|---|---|---|---|
| R | 1 | 0 | 0 | 1 | 0 | 0 | 36 |
| \| | 1 | 0 | 0 | 1 | 1 | 0 | 38 |
| \| | 1 | 1 | 0 | 1 | 1 | 0 | 54 |
| N | 1 | 1 | 0 | 1 | 1 | 0 | 54 |
| \| | 1 | 1 | 0 | 1 | 1 | 1 | 55 |
| \| | 0 | 1 | 0 | 1 | 1 | 1 | 23 |
| D | 0 | 1 | 0 | 1 | 0 | 1 | 21 |
| M | 0 | 1 | 1 | 1 | 0 | 1 | 29 |

TABLE 3-A5

| Normal | SW 1 | 2 | 3 | 4 | 5 | 6 | Calculated value |
|---|---|---|---|---|---|---|---|
| R | 1 | 0 | 0 | 1 | 1 | 0 | 38 |
| \| | 1 | 0 | 0 | 1 | 1 | 0 | 38 |
| \| | 1 | 0 | 0 | 0 | 1 | 0 | 34 |
| N | 1 | 1 | 0 | 0 | 1 | 0 | 50 |
| \| | 0 | 1 | 0 | 0 | 1 | 0 | 18 |
| \| | 0 | 1 | 0 | 0 | 1 | 1 | 19 |
| D | 0 | 1 | 0 | 0 | 1 | 1 | 19 |
| M | 0 | 1 | 1 | 0 | 1 | 1 | 27 |

TABLE 3-B5

| Normal | SW 1 | 2 | 3 | 4 | 5 | 6 | Calculated |
|---|---|---|---|---|---|---|---|
| R | 1 | 0 | 0 | 1 | 1 | 0 | 38 |
| \| | 1 | 0 | 0 | 1 | 1 | 0 | 38 |
| \| | 1 | 1 | 0 | 1 | 1 | 0 | 54 |
| N | 1 | 1 | 0 | 0 | 1 | 0 | 50 |
| \| | 1 | 1 | 0 | 0 | 1 | 1 | 51 |
| \| | 0 | 1 | 0 | 0 | 1 | 1 | 19 |
| D | 0 | 1 | 0 | 0 | 1 | 1 | 19 |
| M | 0 | 1 | 1 | 0 | 1 | 1 | 27 |

TABLE 3-A6

| Normal | SW 1 | 2 | 3 | 4 | 5 | 6 | Calculated value |
|---|---|---|---|---|---|---|---|
| R | 1 | 0 | 0 | 1 | 0 | 1 | 37 |
| \| | 1 | 0 | 0 | 1 | 1 | 1 | 39 |
| \| | 1 | 0 | 0 | 0 | 1 | 1 | 35 |
| N | 1 | 1 | 0 | 0 | 1 | 1 | 51 |
| \| | 0 | 1 | 0 | 0 | 1 | 1 | 19 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

TABLE 3-B6

| Normal | SW 1 | 2 | 3 | 4 | 5 | 6 | Calculated |
|---|---|---|---|---|---|---|---|
| R | 1 | 0 | 0 | 1 | 0 | 1 | 37 |
| \| | 1 | 0 | 0 | 1 | 1 | 1 | 39 |
| \| | 1 | 1 | 0 | 1 | 1 | 1 | 55 |
| N | 1 | 1 | 0 | 0 | 1 | 1 | 51 |
| \| | 1 | 1 | 0 | 0 | 1 | 1 | 51 |
| \| | 0 | 1 | 0 | 0 | 1 | 1 | 19 |
| D | 0 | 1 | 0 | 0 | 0 | 1 | 17 |
| M | 0 | 1 | 1 | 0 | 0 | 1 | 25 |

Table 4 according to the embodiment of the present invention summarizes the calculated value of each switch during the normal condition and the first failure condition including the OFF-failure condition and the ON-failure condition. Table 4 includes table 4-A corresponding to the first ON-OFF switching pattern illustrated in FIG. 3 and table 4-B corresponding to the second ON-OFF switching pattern illustrated in FIG. 4.

TABLE 4-A

| Normal Condition | OFF-Failure SW 1 | 2 | 3 | 4 | 5 | 6 | ON-Failure SW 1 | 2 | 3 | 4 | 5 | 6 |
|---|---|---|---|---|---|---|---|---|---|---|---|---|
| R | 36 | 4 | 36 | 36 | 32 | 36 | 36 | 36 | 52 | 44 | 36 | 38 | 37 |
| \| | 38 | 6 | 38 | 38 | 34 | 36 | 38 | 38 | 54 | 46 | 38 | 38 | 39 |
| \| | 34 | 2 | 34 | 34 | 34 | 32 | 34 | 34 | 50 | 42 | 38 | 34 | 35 |
| N | 50 | 18 | 34 | 50 | 50 | 48 | 50 | 50 | 50 | 58 | 54 | 50 | 51 |
| \| | 18 | 18 | 2 | 18 | 18 | 16 | 18 | 50 | 18 | 26 | 22 | 18 | 19 |
| \| | 19 | 19 | 3 | 19 | 19 | 17 | 18 | 51 | 19 | 27 | 23 | 19 | 19 |
| D | 17 | 17 | 1 | 17 | 17 | 17 | 16 | 49 | 17 | 25 | 21 | 19 | 17 |
| M | 25 | 25 | 9 | 17 | 25 | 25 | 24 | 57 | 25 | 25 | 29 | 27 | 25 |

TABLE 4-B

| Normal Condition | OFF-Failure SW 1 | 2 | 3 | 4 | 5 | 6 | ON-Failure SW 1 | 2 | 3 | 4 | 5 | 6 |
|---|---|---|---|---|---|---|---|---|---|---|---|---|
| R | 36 | 4 | 36 | 36 | 32 | 36 | 36 | 36 | 52 | 44 | 36 | 38 | 37 |
| \| | 38 | 6 | 38 | 38 | 34 | 36 | 38 | 38 | 54 | 46 | 38 | 38 | 39 |
| \| | 34 | 22 | 38 | 54 | 50 | 52 | 34 | 54 | 54 | 62 | 54 | 54 | 55 |
| N | 50 | 18 | 34 | 50 | 50 | 48 | 50 | 50 | 50 | 58 | 54 | 50 | 51 |
| \| | 51 | 19 | 35 | 51 | 51 | 49 | 50 | 51 | 51 | 59 | 55 | 51 | 51 |
| \| | 19 | 19 | 3 | 19 | 19 | 17 | 18 | 51 | 19 | 27 | 23 | 19 | 19 |
| D | 17 | 17 | 1 | 17 | 17 | 17 | 16 | 49 | 17 | 25 | 21 | 19 | 17 |
| M | 25 | 25 | 9 | 17 | 25 | 25 | 24 | 57 | 25 | 25 | 29 | 27 | 25 |

Table 5 summarizes the map of the first operating position judgment reference 37 according to the first embodiment of the present invention.

TABLE 5

| Calculated Value | Condition | Assumed Shift Stage | R | — | — | N | — | — | D | M |
|---|---|---|---|---|---|---|---|---|---|---|
| 1 | Failure | D | | | | | | | | ○ |
| 2 | Failure | N | | | | ○ | ○ | | | |
| 3 | Failure | D | | | | | | | ○ | |
| 4 | Failure | R | ○ | | | | | | | |
| 6 | Failure | R | | ○ | | | | | | |
| 9 | Failure | D | | | | | | | | ○ |
| 16 | Failure | D | | | | | ○ | ○ | | |
| 17 | Normal | D | | | | | | ○ | ○ | ○ |
| 18 | Intermediate | N | | | | ○ | ○ | ○ | | |
| 19 | Intermediate | D | | | | | ○ | ○ | ○ | |
| 21 | Failure | D | | | | | | | ○ | |
| 22 | Failure | N | | | | ○ | ○ | | | |
| 23 | Failure | D | | | | | ○ | | | |
| 24 | Failure | D | | | | | | | | ○ |
| 25 | Normal | D | | | | | | | ○ | ○ |
| 26 | Failure | N | | | | ○ | | | | |
| 27 | Failure | D | | | | | | ○ | | ○ |
| 29 | Failure | D | | | | | | | | ○ |
| 32 | Failure | R | ○ | ○ | ○ | | | | | |
| 34 | Intermediate | N | | | ○ | ○ | ○ | | | |
| 35 | Failure | N | | | ○ | ○ | | | | |
| 36 | Normal | R | ○ | ○ | | | | | | |
| 37 | Failure | R | ○ | | | | | | | |
| 38 | Intermediate | R | ○ | ○ | ○ | | | | | |
| 39 | Failure | R | | ○ | | | | | | |
| 42 | Failure | N | | | ○ | | | | | |
| 44 | Failure | R | ○ | | | | | | | |
| 46 | Failure | R | | ○ | | | | | | |
| 48 | Failure | N | | | | ○ | | | | |
| 49 | Failure | D | | | | | | ○ | ○ | |
| 50 | Normal | N | | | | ○ | ○ | ○ | | |
| 51 | Intermediate | N | | | | ○ | ○ | ○ | | |
| 52 | Failure | R | ○ | ○ | | | | | | |
| 54 | Intermediate | N | | | ○ | ○ | ○ | | | |
| 55 | Failure | N | | | | ○ | ○ | | | |
| 57 | Failure | D | | | | | | | | ○ |
| 58 | Failure | N | | | | ○ | | | | |
| 59 | Failure | N | | | | ○ | | | | |
| 62 | Failure | N | | | ○ | | | | | |

In order to describe the method of calculating the calculated value by the calculated value calculating means 31, a predetermined value of each switch at the ON or OFF state is first defined as follow. For example, the predetermined value of the switch SW6 is designed at "1" at the ON state, while it is designed at "0" at the OFF state. The predetermined value witch SW5 is designed at "2" at the ON state, while it is designed at "0" at the OFF state. The predetermined value of the switch SW4 is designed at "4" at the ON state, while it is designed at "0" at the OFF state. The predetermined value of the switch SW3 is designed at "8" at the ON state, while it is designed at "0" at the OFF state. The predetermined value of the switch SW2 is designed at "16" at the ON state, while it is designed at "0" at the OFF state. The predetermined value of the switch SW1 is designed at "32" at the ON state, while it is designed at "0" at the OFF state. The calculated value is calculated by adding the predetermined values of all of the switches at the ON or OFF state corresponding to each shift lever position. The calculated value represents the ON or OFF state of the six switches SW1, SW2, SW3, SW4, SW5 and SW6. The single calculated value is assigned for each shift lever position.

Pursuant to the above-described definition and calculating method, Tables 1A and 1B summarize the ON or OFF condition of each switch and the calculated value corresponding to each shift lever position at the event that all the switches are at the normal condition. In Tables 1A and 1B, each switch at the ON state is expressed with a reference "1", while each switch at the OFF state is expressed with a reference "0", only for convenience. Tables 2 and 3 summarize the ON or OFF state of each switch and the calculated value corresponding to each shift lever position during the first failure condition. In these Tables, each switch at the ON state is also expressed with the reference "1", while each switch at the OFF state is expressed with the reference "0", only for convenience.

Taking the first ON-OFF switching pattern of each switch illustrated in FIG. 3 and the reverse shift position R at Table 1A as an example, i.e., when the shift lever 4 has been placed at the reverse shift position R during the first pattern (illustrated in FIG. 3) of each switch at the normal condition, only the switches SW1 and SW4 are at the ON state and the other switches are at the OFF state during the normal condition. Therefore, pursuant to the above-described definition and the calculating method, the calculated value at the reverse shift position R is 36 (=32+0+0+4+0+0).

Taking the first ON-OFF switching pattern of each switch illustrated in FIG. 3, and the reverse shift position R at table 2-A1 as an example, only the switch SW4 is at the ON state and the other switches are at the OFF state while the switch SW1 has been at the OFF-failure condition. Therefore, pursuant to the above-described definition and the calculating method, the calculated value at the reveres shift position R is 4 (=0+0+0+4+0+0).

Taking the first ON-OFF switching pattern of each switch illustrated in FIG. 3, and the reverse shift position R at Table 2-A2 as an example, only the switches SW1 and SW4 are at the ON state and the other switches are at the OFF state while the switch SW2 has been at the OFF-failure condition. Therefore, pursuant to the above-described definition and the calculating method, the calculated value at the reverse shift position R is 36 (=32+0+0+4+0+0). Since the switch SW2 is at the OFF state also during the normal condition, the switch condition does not apparently change even when the switch SW2 malfunctions.

Table 5 exhibits the condition corresponding to each calculated value in Tables 4A and 4B (normal condition, shift intermediate condition and failure condition), the assumed shift position and the shift position at which the calculated value is obtained. Table 5 corresponds to the first operating position judgment reference 37. Followings are employed to computationally determine the assumed position of the shift lever 4 based upon Table 5.

(1) When the shift lever 4 is actually placed at each of the shift positions R, N, D and M during the normal condition, the first operating position judging means 32 computationally decides that the shift lever 4 is assumed to have been placed at the actual shift position. Even if the calculated value at the event of the normal condition is obtained during the failure condition, the shift lever 4 is assumed to have been placed at the normal position.

(2) There is a possibility that the calculated value obtained within the shifting range R–N and the shifting range N–D is also obtained or calculated during the normal condition. Therefore, the first operating position judging means 32 cannot judge the failure condition accurately. For example, when a user intentionally holds the shift lever 4 within the shifting range R–N, the first operating position judging means 32 cannot judge the failure condition.

(3) The first operating position judging means 32 recognizes the single switch failure condition in the other cases except for (1) and (2), thereby determining the shift lever position. For example, the calculated value 2 is obtained when the shift lever 4 is placed at both sides of the neutral position N, so that the shift lever 4 is assumed to have been placed at the neutral position N. Further, the calculated value 3 is obtained when the shift lever 4 is placed at the side of the automated forward-shift position D within the shifting range N–D, and so the shift lever 4 is assumed to have been placed at the automated forward-shift position D.

As described above, according to the embodiment of the present invention, the first operating position judgment reference 37 can define the switch conditions corresponding to all the shift lever positions beforehand. By referring to them, the first operating position judging means 32 can judge the operating position of the shift lever 4 and can judge whether the shift lever 4 has been at the failure condition.

Next, following explanation will be given for explaining the second operating position judgment reference 38 with reference to the attached drawing.

Table 6 summarizes the map of the second operating position judgment reference 38 according to the embodiment of the present invention. Table 6 corresponds to the second operating position judgment reference 38.

TABLE 6

Failure condition: F, Intermediate condition: I, Normal condition: N

| Calculated value | Condition | Assumed Shift stage | OFF-Failure SW | | | | | | ON-Failure SW | | | | | | |
|---|---|---|---|---|---|---|---|---|---|---|---|---|---|---|---|
| | | | 1 | 2 | 3 | 4 | 5 | 6 | 1 | 2 | 3 | 4 | 5 | 6 | |
| 1 | F | D | 0 | 0 | 0 | 0 | 0 | 0 | 33 | 17 | 9 | 5 | 3 | 0 | |
| 2 | F | N | 0 | 0 | 0 | 0 | 0 | 0 | 34 | 18 | 10 | 6 | 0 | 3 | F→F |
| 3 | F | D | 0 | 0 | 0 | 0 | 1 | 2 | 35 | 19 | 11 | 7 | 0 | 0 | |
| 4 | F | R | 0 | 0 | 0 | 0 | 0 | 0 | 36 | 20 | 12 | 0 | 6 | 5 | |
| 6 | F | R | 0 | 0 | 0 | 0 | 4 | 0 | 38 | 22 | 14 | 0 | 0 | 7 | |
| 9 | F | D | 0 | 0 | 1 | 0 | 0 | 8 | 41 | 25 | 0 | 13 | 11 | 0 | |
| 16 | F | D | 0 | 0 | 0 | 0 | 0 | 0 | 48 | 0 | 24 | 20 | 18 | 17 | |
| 17 | N | D | 0 | 1 | 0 | 0 | 0 | 16 | 49 | 0 | 25 | 21 | 19 | 0 | |
| 18 | I | N | 0 | 2 | 0 | 0 | 16 | 0 | 50 | 0 | 26 | 22 | 0 | 19 | F→F, I |
| 19 | I | D | 0 | 3 | 0 | 0 | 17 | 18 | 51 | 0 | 27 | 23 | 0 | 0 | |
| 21 | F | D | 0 | 5 | 0 | 17 | 0 | 20 | 53 | 0 | 29 | 0 | 23 | 0 | |
| 22 | F | N | 0 | 6 | 0 | 18 | 20 | 0 | 54 | 0 | 30 | 0 | 0 | 23 | F→F |
| 23 | F | D | 0 | 7 | 0 | 19 | 21 | 22 | 55 | 0 | 31 | 0 | 0 | 0 | |
| 24 | F | D | 0 | 8 | 16 | 0 | 0 | 0 | 56 | 0 | 0 | 28 | 26 | 25 | |

TABLE 6-continued

Failure condition: F, Intermediate condition: I, Normal condition: N

| Calculated value | Assumed Condition | Shift stage | OFF-Failure SW | | | | | | ON-Failure SW | | | | | | |
|---|---|---|---|---|---|---|---|---|---|---|---|---|---|---|---|
| | | | 1 | 2 | 3 | 4 | 5 | 6 | 1 | 2 | 3 | 4 | 5 | 6 | |
| 25 | N | D | 0 | 9 | 17 | 0 | 0 | 24 | 57 | 0 | 0 | 29 | 27 | 0 | |
| 26 | F | N | 0 | 10 | 18 | 0 | 24 | 0 | 58 | 0 | 0 | 30 | 0 | 27 | F→F |
| 27 | F | D | 0 | 11 | 19 | 0 | 25 | 26 | 59 | 0 | 0 | 31 | 0 | 0 | |
| 29 | F | D | 0 | 13 | 21 | 25 | 0 | 28 | 61 | 0 | 0 | 0 | 31 | 0 | |
| 32 | F | R | 0 | 0 | 0 | 0 | 0 | 0 | 0 | 48 | 48 | 36 | 34 | 33 | |
| 34 | I | N | 2 | 0 | 0 | 0 | 32 | 0 | 0 | 50 | 50 | 38 | 0 | 35 | F→F, I |
| 35 | F | N | 3 | 0 | 0 | 0 | 33 | 34 | 0 | 51 | 51 | 39 | 0 | 0 | F→F |
| 36 | N | R | 4 | 0 | 0 | 32 | 0 | 0 | 0 | 52 | 52 | 0 | 38 | 37 | |
| 37 | F | R | 5 | 0 | 0 | 33 | 0 | 36 | 0 | 53 | 53 | 0 | 39 | 0 | |
| 38 | I | R | 6 | 0 | 0 | 34 | 36 | 0 | 0 | 54 | 54 | 0 | 0 | 39 | |
| 39 | F | R | 7 | 0 | 0 | 35 | 37 | 38 | 0 | 55 | 55 | 0 | 0 | 0 | |
| 42 | F | N | 10 | 0 | 34 | 0 | 40 | 0 | 0 | 58 | 58 | 46 | 0 | 43 | F→F |
| 44 | F | R | 12 | 0 | 36 | 40 | 0 | 0 | 0 | 60 | 60 | 0 | 46 | 45 | |
| 46 | F | R | 14 | 0 | 38 | 42 | 44 | 0 | 0 | 62 | 62 | 0 | 0 | 47 | |
| 48 | F | N | 16 | 32 | 0 | 0 | 0 | 0 | 0 | 0 | 0 | 52 | 50 | 49 | F→F |
| 49 | F | D | 17 | 33 | 0 | 0 | 0 | 48 | 0 | 0 | 0 | 53 | 51 | 0 | |
| 50 | N | N | 18 | 34 | 0 | 0 | 48 | 0 | 0 | 0 | 0 | 54 | 0 | 51 | |
| 51 | I | N | 19 | 35 | 0 | 0 | 49 | 50 | 0 | 0 | 0 | 55 | 0 | 0 | F→F, I |
| 52 | F | R | 20 | 36 | 0 | 48 | 0 | 0 | 0 | 0 | 0 | 0 | 54 | 53 | |
| 54 | I | N | 22 | 38 | 0 | 50 | 52 | 0 | 0 | 0 | 0 | 0 | 0 | 55 | F→F, I |
| 55 | F | N | 23 | 39 | 0 | 51 | 53 | 54 | 0 | 0 | 0 | 0 | 0 | 0 | F→F |
| 57 | F | D | 25 | 41 | 49 | 0 | 0 | 56 | 0 | 0 | 0 | 61 | 59 | 0 | |
| 58 | F | N | 26 | 42 | 50 | 0 | 56 | 0 | 0 | 0 | 0 | 62 | 0 | 59 | |
| 59 | F | N | 27 | 43 | 51 | 0 | 57 | 58 | 0 | 0 | 0 | 63 | 0 | 0 | F→F |
| 62 | F | N | 30 | 46 | 54 | 58 | 60 | 0 | 0 | 0 | 0 | 0 | 0 | 63 | F→F |

The left-side three rows in Table 6 shows each calculated value summarized in Table 5 (normal condition, shift intermediate condition and failure condition), the assumed shift position and the shift position at which the calculated value is obtained. The right-side twelve rows in Table 6 shows a calculated value under the plural-switches failure condition, i.e., a calculated value obtained at the event that the other switch malfunctions in addition to the switch which has been already at the single switch failure condition. When the calculated value at the plural-switches failure condition is the same as the calculated value at the single switch failure condition, the calculated value is indicated with a reference "0" for convenience. The actual calculated value, which has been expressed with the reference "0", actually corresponds to the calculated value at the very left-side row. For example, when the calculated value 1 appears during the single switch failure condition, the switch is judged to have been at the failure condition and the shift lever 4 is computationally decided to have been at the automated forward-shift stage D. When the switch SW1 further malfunctions under the aforementioned condition, the calculated value 33 appears pursuant to the second operating position judgment reference 38.

Following cases are expected during the plural-switches failure condition.

(1) When the calculated value in accordance with the second operating position judgment reference 38 does not correspond to the calculated value in accordance with the first operating position judgment reference 37, the second operating position judging means 33 can determine that the plural-switches failure has occurred, thereby computationally deciding the shift lever position at the neutral position N. For example, when the calculated value 1 appears during the single switch failure condition, the shift lever 4 is computationally decided to have been at the automated forward-shift position D. When the switch SW1 further malfunctions under this single switch failure condition, the calculated value 33 is obtained. This calculated value 33 does not exist in the first operating position judgment reference 38. Therefore, the second operating position judging means 33 recognizes the plural-switches failure and computationally decides that the shift lever 4 is placed at the neutral position N.

(2) When the calculated value during the plural-switches failure condition corresponds to the calculated value during the single switch failure condition, and the assumed shift position during the plural-switches failure condition corresponds to the assumed shift position during the single switch failure condition, misjudgment of the shift lever position does not occur. Therefore, the assumed shift lever position is identical. For example, when the calculated value 1 appears during the single switch failure condition, the shift lever 4 is computationally decided to have been placed at the automated forward-shift position D. When the switch SW2 further malfunctions under this single switch failure condition, the calculated value 17 is obtained. This calculated value 17 does exist in the first operating position judgment reference 38. The shift lever 4 is computationally decided to have been placed at the automated forward-shift position D both during the first and plural-switches failure conditions, thereby recognizing the normal condition.

(3) When the calculated value during the plural-switches failure condition corresponds to the calculated value during the single switch failure condition, the assumed shift position during the plural-switches failure condition does not correspond to the assumed shift position during the single switch failure condition, and the shift lever 4 is assumed to have been placed at the neutral position N during the plural-switches failure condition, the shift lever 4 is computationally decided to have been placed at the neutral position N. For example, when the calculated value 3 appears during the single switch failure condition, the shift lever 4 is computationally decided to have been placed at the automated forward-shift position D. When the switch SW1 further malfunctions under this single switch failure condition, the calculated value 35 is obtained. This calculated value 35 does exist in the first operating position judgment reference 38. The shift lever 4 is computationally decided to have been placed at the neutral position N by the single switch failure, thereby assuring a driving security.

(4) When the calculated value during the plural-switches failure condition corresponds to the calculated value during the single switch failure condition, the assumed operating position during the plural-switches failure condition does not correspond to the assumed operating position during the single switch failure condition, the shift lever 4 is computationally decided to have been placed at any of the shift positions except for the neutral position N, the shift lever 4 is computationally decided to have been placed at the neutral position N. For example, when the calculated value 2 appears during the single switch failure condition, the shift lever 4 is computationally decided to have been placed at the neutral position N. When the switch SW4 further malfunctions under single switch failure condition, the calculated value 6 is obtained. This calculated value 6 does exist in the first operating position judgment reference 38. The shift lever 4 is computationally decided to have been placed at the reverse shift position R by the single switch failure. That is, there is a possibility that the shift lever may be assumed to have been placed at the reverse shift position R simply due to the failure even when the shift lever 4 is not shifted from the neutral position N at which the shift leer 4 has been actually placed. In order to prevent this, the shift lever 4 is computationally decided to have been placed at the neutral position. This case is applied to any one of the following six patterns: (a) the neutral position N during the single switch failure condition to the automated forward-shift position D during the plural-switches failure condition; (b) the neutral position N during the single switch failure condition to the reverse shift position R; (c) the neutral position N during the intermediate condition to the automated forward-shift position D during the intermediate condition; (d) the neutral position N during the intermediate condition to the reverse shift position R during the intermediate condition; (e) the neutral position N during the intermediate condition to the automated forward-shift position D during the plural-switches failure condition; and (f) the neutral position N during the intermediate condition to the reverse shift position R during the plural-switches failure condition. When the computer 3 judges that at least any one of (a) to (f) is satisfied, the shift lever 4 can be controlled to be placed at the neutral position-N by a solenoid and so on. Further, when the calculated value changes after controlling the shift lever 4 at the neutral position N or at the currently selected shift position, the shift lever 4 can be shifted to any one of the other shift positions.

Figure 5:
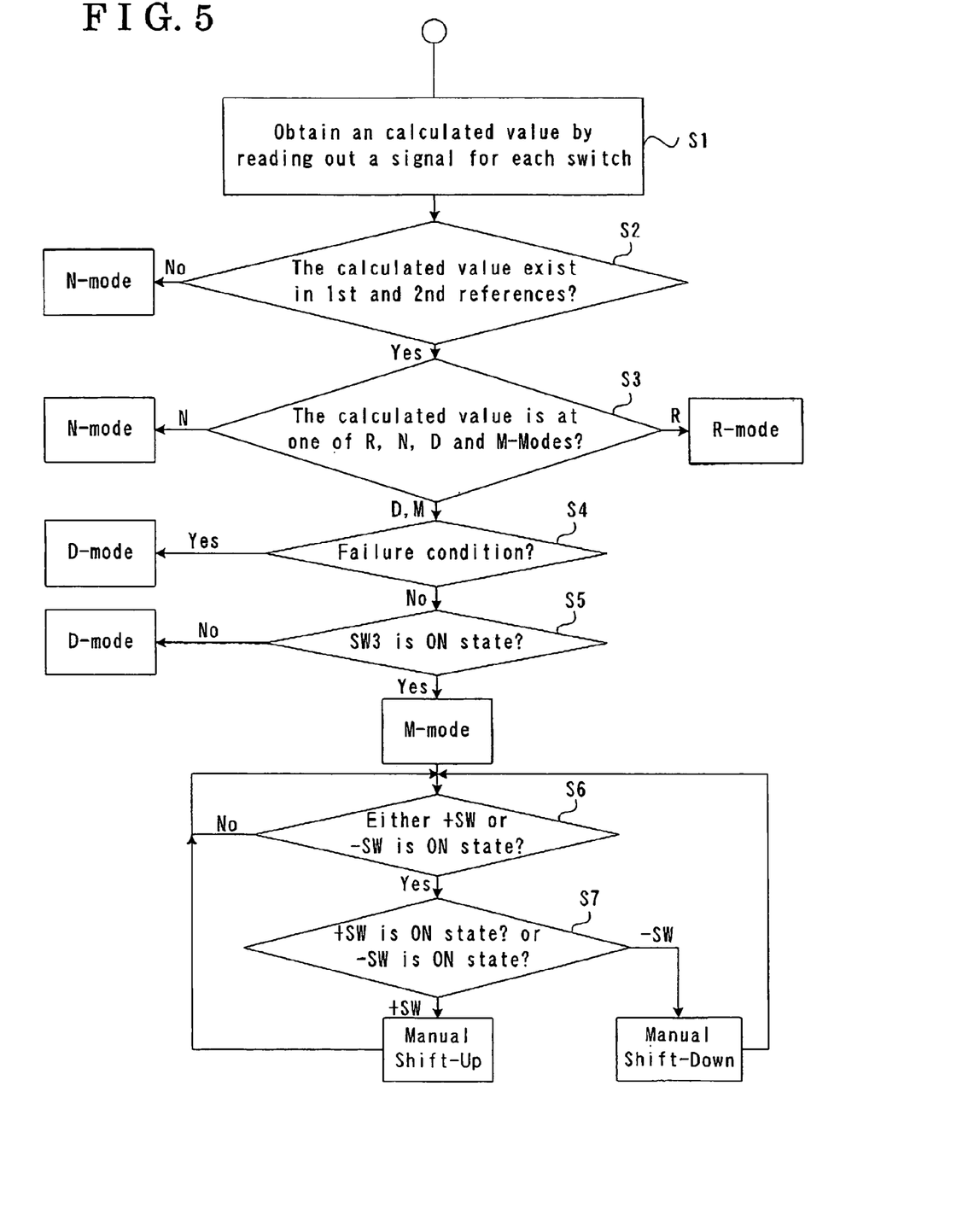
FIG. 5 is a flowchart for explaining an operation of the shift lever operating position judging device according to the embodiment of the present invention.

There will next be described operation of the shift lever operating position judging device according to the embodiment of the present invention with reference to the flowchart illustrated in FIG. 5.

A program is initiated at step S1 to read out a signal representing the ON or OFF state of each switch of the shift lever position sensor 2 and to calculate the calculated value based upon the signal. The computer 3 judges at step S2 whether the calculated value exists in the first operating position judgment reference 37 and the second operating position judgment reference 38. When a negative answer NO is obtained at step S2, the computer 3 recognizes an N mode, i.e., that the computer 3 assume that the shift lever 4 has been placed at the neutral position N. When an affirmative answer YES is obtained at step S2, the program proceeds to step S3.

At step S3, the computer 3 judges a current mode of the calculated value pursuant to the first and second operating position judgment references 37 and 38 from an R mode, an N mode, a D mode and an M mode. When the calculated value exists at the R or N mode, the computer 3 assumes that the shift lever 4 has been placed at the reverse shift position R or at the neutral position N. When the calculated value exists at the D or M mode, the program proceeds to step S4.

At step S4, the computer 3 judges whether the failure condition has been detected pursuant to the first operating position judgment reference 37. When the computer 3 recognizes the failure condition, the computer 3 judges that the calculated value exists at the D mode. That is, the computer 3 assumes that the shift lever 4 has been at the automated forward-shift position D. When the computer 3 does not recognize the failure condition, the program proceeds to step S5.

At step S5, the computer 3 judges whether the shift lever 4 has been actually place at the manual forward-shift position M, i.e., whether the switch SW3 has been at the ON state. When the switch SW3 is at the OFF state, the calculated value exists at the D-mode. That is, the computer 3 assumes that the shift lever 4 has been placed at the automated forward-shift position D. When the shift SW3 is at the ON state, the calculated value exists at the M-mode. That is, the computer 3 assumes that the shift lever 4 has been placed at the manual forward-shift position M. The program then proceeds to step S6.

At step S6, the computer 3 judges whether either the shift-up switch 5a or the shift-down switch 5b is at the ON state. When both of the shift-up switches 5a and the shift-down switches 5b are at the OFF state, the process at step S6 is repeated again. That is, at step S6, the signal from either the shift-up switch 5a or the shift-down switch 5b is at a stand-by condition to be sent to the computer 3. When either the shift-up switch 5a or the shift-down switch 5b is at the ON state, the program proceeds to step S7.

At step S7, the computer 3 judges which switch is at the ON state. When the shift-up switch 5a is at the ON state, the shift stage being selected in the transmission is shifted up. The program then returns to step S6. When the shift-down switch 5b is at the OFF state, the shift stage being selected in the transmission is shifted down. The program then returns to step S6. However, even when the shift-up switch 5a is turned on during the highest shift stage being selected in the transmission, the highest shift stage is not shifted up. Further, even when the shift-down switch 5b is turned off during the lowest shift stage being selected in the transmission, the lowest shift stage is not shifted down.

As described above, according to the embodiment of the present invention, the second operating position judging means 33 determines the assumed shift position of the shift lever 4 based upon whether the calculated value by the calculated value calculating means 31 exists in the first operating position judgment reference 37 and whether the assumed shift position of the first operating position judgment reference 37 corresponds to the assumed shift position of the second operating position judgment reference 38. Alternatively, the second operating position judging means 33 can uniformly judge that the shift lever 4 has been positioned at the safe position (neutral position N) when the calculated value by the calculated value calculating means 31 exists in the second operating position judgment reference 38, thereby enabling to enhance the driving security during the plural-switches failure condition.

As described above, according to the embodiment of the present invention, the shift lever operating position and the failure condition can be judged without providing two groups of switches for one switch system, thereby enabling to enhance the performance of judgment the shift lever position and reducing the cost for manufacturing the device.

Further, according to the embodiment of the present invention, the device is provided with the judgment limiting means, thereby enabling to limit the shift lever position in response to the failure condition.

Still further, according to the embodiment of the present invention, the shift lever can be judged whether has been placed at the neutral position, the reverse shift position or the forward-shift position during the single switch failure condition. During the plural-switches failure condition, the shift lever can be judged whether has been placed at the neutral position, the reverse shift position or the forward-shift position or can be fixed to the neutral mode. Therefore, the security can be assured.

The principles, the preferred embodiments and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shift lever operating position judging device comprising:
   a position sensor having a plurality of switches and outputting a signal associated with an ON or OFF state of the respective switches, the plurality of switches turned on and off in response to a position of a shift lever which is selectively operated within a shift lever operating range having at least four operating positions (R, N, D and M), wherein each switch is arranged to be at an ON state within a different shift range included in the shift lever operating range, and two or three switches of the plurality of switches are at the ON state in a different combination in response to each shift lever operating position;
   a calculated value calculating means reading the signal representing the ON or OFF state of the respective switches and calculating a calculated value based upon the signal, the calculated value representing the ON or OFF state of the respective switches at each shift lever operating position; and
   a first operating position judging means for judging the position of the shift lever corresponding to the calculated value obtained by the calculated value calculating means following a first operating position judgment reference defining the calculated value at the event that all of the plurality of switches have been at a normal condition, wherein the first operating position judgment reference defines the calculated value representing the ON or OFF state of the respective switches at each shift lever operating position at the event that one of all of the plurality of switches is at a single switch failure condition, and the first operating position judging means judges the position of the shift lever corresponding to the calculated value and judges whether the respective switches are at the normal condition or at the single switch failure condition, pursuant to the first operating position judgment reference.

2. A shift lever operating position judging device according to claim 1, wherein the single calculated value of the first operating position judgment reference is assigned to the each single operating position of the shift lever.

3. A shift lever operating position judging device according to claim 1, further comprising: a second operating position judging means for judging the position of the shift lever pursuant to the first operating position judgment reference and a second operating position judgment reference defining the calculated value representing the ON or OFF state of the respective switches at the each shift lever operating position at the event that more than two switches of the plurality of switches are at a plural-switches failure condition, wherein the second operating position judging means computationally decides that the shift lever is placed at a safe position and recognizes the plural-switches failure condition when the calculated value calculated by the calculated value calculating means does not exist in the first operating position judgment reference, the second operating position judging means judges that an assumed shit lever position is identical when the calculated value exists in the first operating position judgment reference and the assumed shift lever position by the first operating position judgment reference corresponds to the assumed shift lever position by the second operating position judgment reference, and the second operating position judging means computationally decides that the shift lever is placed at the safe position when the calculated value exists in the first operating position judgment reference and the assumed shift lever position by the first operating position judgment reference does not correspond to the assumed shift lever position by the second operating position judgment reference.

4. A shift lever operating position judging device according to claim 1, further comprising: a second operating position judging means for assuming that the shift lever is placed at a safe position when the calculated value exists in a second operating position judgment reference, pursuant to the second operating position judgment reference defining the calculated value representing the ON or OFF state of the respective switches at the each shift lever operating position at the event that more than two switches of the plurality of switches are at a plural-switches failure.

5. A shift lever operating position judging device according to claim 2, further comprising: a second operating position judging means for assuming that the shift lever is placed at a safe position when the calculated value exists in a second operating position judgment reference, pursuant to the second operating position judgment reference defining the calculated value representing the ON or OFF state of the respective switches at the each shift lever operating position at the event that more than two switches of the plurality of switches are at a plural-switches failure.

6. A shift lever operating position judging device according to claim 4, wherein the safe position is a neutral position.

7. A shift lever operating position judging device according to claim 5, wherein the safe position is a neutral position.

8. A shift lever operating position judging device according to claim 3, further comprising:
   releasing means for releasing the second operating position judging means from being operated and operating the first operating position judging means when at least two of the switches at the plural-switches failure condition are switched between the ON state and an OFF state within a predetermined period of time after the recognition of the plural-switches failure.

9. A shift lever operating position judging device according to claim 1, further comprising:

judgment limiting means for limiting a judgment that the shift lever is placed at a dangerous position when more than one switch of the plurality of switches is at the single switch failure condition or at the plural-switches failure condition.

10. A shift lever operating position judging device according to claim 3, further comprising:

judgment limiting means for limiting a judgment that the shift lever is placed at a dangerous position when more than one switch of the plurality of switches is at the single switch failure condition or at the plural-switches failure condition.

11. A shift lever operating position judging device according to claim 7, wherein the dangerous position is a manual position.

12. A shift lever operating position judging device according to claim 1, further comprising:

returning means for returning more than one switch of the plurality of switches at the single switch failure condition or at the plural-switches failure condition to the normal condition when a condition that the each switch is assumed to have been at a nonfailure condition in response to the each shift lever operating position is kept more than a predetermined period of time.

13. A shift lever operating position judging device according to claim 3, further comprising:

returning means for returning more than one switch of the plurality of switches at the single switch failure condition or at the plural-switches failure condition to the normal condition when a condition that the each switch is assumed to have been at a nonfailure condition in response to the each shift lever operating position is kept more than a predetermined period of time.

* * * * *